INVENTORS
ARMIN ELMENDORF
ROLAND ETZOLD
THOMAS W. VAUGHAN
BY Townsend and Townsend
ATTORNEYS

United States Patent Office 3,457,094
Patented July 22, 1969

3,457,094
METHOD OF UPGRADING LOW GRADE PLYWOOD
Armin Elmendorf, Portola Valley, Roland Etzold, Menlo Park, and Thomas W. Vaughan, Sunnyvale, Calif., assignors to Armin Elmendorf, Portola Valley, Calif.
Continuation-in-part of application Ser. No. 528,842, Feb. 21, 1966. This application Nov. 15, 1967, Ser. No. 683,193
Int. Cl. B05c 5/00; B44d 5/00
U.S. Cl. 117—2                              13 Claims

ABSTRACT OF THE DISCLOSURE

A method of mechanically upgrading plywood is described wherein open defects in the outer veneers such as knot holes and splits are progressively overfilled with a slurry containing fine mineral granules of a specified maximum hardness using a vibrating doctor blade inclined at an angle of less than 25 degrees to the plywood surface, after first wetting the surface in order to maintain the consistency of the slurry.

---

The present patent application is a continuation-in-part of co-pending application No. 528,842, filed February 21, 1966, "Method of Upgrading Low Grade Plywood."

In the above identified patent application a method is described for filling open defects and depressions in the surface of plywood panels such as knot holes, splits, rough cutting, and torn grain. A composition in the form of a slurry is prepared which consists of fine mineral granules, a thermo-setting resin, and a suitable solvent. This is spread evenly over the panel surface filling the defects by oscillatory motion while the panel moves. The panel so surfaced is then pressed in a hot press with a smooth plate in contact with the veneer. The pressure is applied and maintained until the composition has hardened and the resin has polymerized. The slurry is sufficiently fluid to fill all open defects and not to pull away from the sides of the holes. Solutions of alcohol and water are preferred to achieve the desired slurry consistency.

In one embodiment of the invention a moist composition of fine mineral granules and a thermo-setting resin is used followed by a slurry. Veneers of the plywood may first be temporarily bonded together after which the composition of mineral granules, resin, and solvent is forced into the open defects. The veneers are then permanently bonded together and the filling composition is cured simultaneously with the bonding.

The present invention is directed to an improved method of filling of the open defects and depressions with a slurry in such a manner that the openings are overfilled and the contents of the openings are dried prior to curing the resin or applying flat hot plate pressure. These results are achieved by vibrating the doctor blade instead of oscillating it and simultaneously applying pressure with the doctor blade set at an angle less than 25 degrees to the surface. We have found that under these conditions the slurry will settle into the openings and some of it will flow laterally under the edge of the blade to overfill the openings and surface depressions. After drying the slurry in the openings and depressions, the filler can be flattened by means of hot plate pressure, or the surface of the panel can be sanded to obtain an even surface.

We have found that when an aqueous slurry is used in which the binder is a thermo-setting resin, it is best to wet the surface of the plywood prior to introducing the slurry. In this way the viscosity of the slurry is maintained in a continuous operation. A dilute adhesive can be used in place of water for wetting the surface.

The slurry can also be prepared with a non-aqueous binder such as polyester resin.

The present invention also includes a method for drying an aqueous slurry after deposition which permits immediate stacking of the panels after filling the openings, thereby eliminating the need for a drier.

Figure 1:
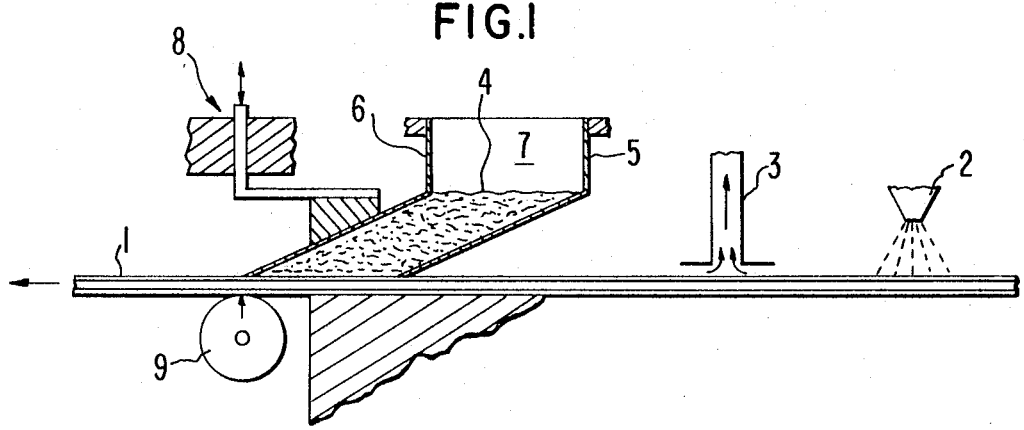
FIGURE 1 is a side elevational view partially in section schematically illustrating apparatus for carrying out various steps of the invention.

In FIGURE 1 illustrating aspects of the present invention the plywood panel 1 moves in a horizontal plane as shown. A spray of water or dilute adhesive 2 impinges upon the surface of the panel to be upgraded thereby wetting it, the excessive moisture or adhesive being drawn away from the surface of the panel by a suction means 3 illustrated schematically. The excess may also be blown away by a narrow jet of air extending across the width of the panel.

The slurry 4 to be described in greater detail below is retained in a region between leading and trailing blades 5 and 6 respectively, such as of thin steel, for example, 10–15 mil and two end plates or dams 7 contacting the edges of the panel 1 and the ends of the doctor blades 5 and 6. The doctor blade 6 is vibrated by means of a vibrating mechanism 8 such as a pneumatic vibrator bearing down on the blade 6. The vibrating mechanism applies a vibrational component to blade 6 in the direction of panel movement. The pressure at the lower edge of the trailing blade 6 is in line with the reaction of the supporting roller 9 for the panel. In this way rotational torque due to the downward pressure is avoided.

In place of vibrating the doctor blade 6, the plywood may be vibrated from below by vibrating the supporting roller 9.

Figure 2:
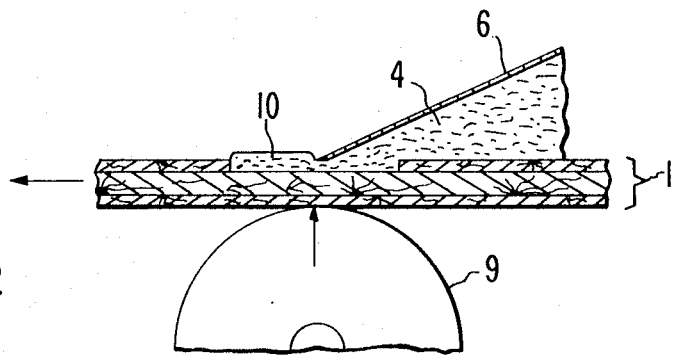
FIGURE 2 is an enlarged elevational sectional view through the plywood and the doctor blade showing a hole being overfilled as the edge of the vibrating blade sweeps over the hole.

FIGURE 2 shows the lower edge of the doctor blade 6 as its sweeps over a knot hole. We have found that by setting the doctor blade at an acute angle less than about 25 degrees with the panel surface, and vibrating this blade 6, the pressure on the slurry is adequate to cause some of it to move laterally under the edge of the blade 6 and to accumulate as a mound 10 above the edge of the blade while the slurry is being removed from the surface of the panel. In this way the surface of the slurry remaining in the holes and depressions is slightly above the surrounding panel surface. Since, as pointed out in greater detail below, the slurry consists primarily of mineral granules, it does not shrink appreciably and the mound or overfill 10 is retained during drying.

The granules of the filler should be derived from a mineral which is not as hard as quartz or sand in order to avoid excessive dulling of a saw and the development of sparks in subsequently sawing through the filler. The granules should therefore be derived from a mineral having a hardness of less than 6.0 on the Moh scale.

Figure 3:
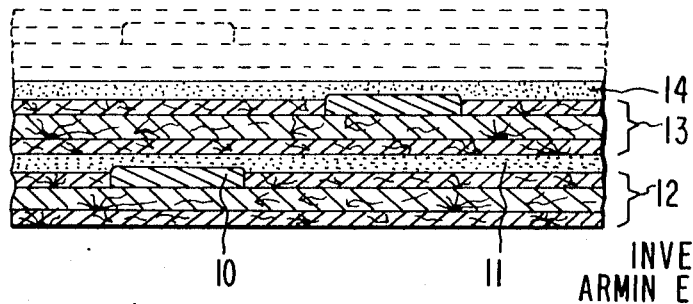
FIGURE 3 is an elevational sectional view showing the step of drying the contents of the openings while the panels are stacked, the stacking being done immediately after filling the openings.

The filled panels are then either allowed to dry, followed by sanding, or they are pressed in a hot plate press after drying. As a mechanical drier is a large and expensive machine it is desirable to be able to dry the slurry without the use of a drying machine. This we have found can be achieved by depositing a layer of fine dry cellulosic particles such as sawdust on the surface of the freshly filled panel over its entire area. FIGURE 3 shows the over-fill 10 and the sawdust 11 spread over a panel 12. When the next panel 13 has been similarly covered with a layer of fine sawdust 14, it is placed upon panel 12, and successive panels are similarly placed to form a stack of panels. The moisture in the slurry is then slowly absorbed by the plywood and the sawdust. After several hours the binder has dried and solidified and the panels may be removed from the stack. After heat curing the resin, the surface may be sanded, the contents of the holes having been solidified. In place of sanding the panels, they may be subjected to hot plate pressure thereby flattening the surface of the filler in the holes and bringing it flush with the surface of the panel. With a temperature exceeding the curing point of the resin, the resin may be cured in the press.

It has been proposed in Patent No. 2,860,597 to overfill the holes in the surface of a plywood panel by means of a highly viscous patching compound using a doctor blade oscillating in the direction of the blade and set at an angle of 45 degrees to the surface of the plywood, and a pump roll under the blade. Two problems associated with that technique are solved in the present invention, namely, the tendency for a thick viscous compound to pull away from the leading edge of the hole to be filled and the tendency for the compound to run over the edges of the panel.

By vibrating the blade 6 in place of oscillating it back and forth in the direction of its length, the problem of keeping the slurry from running off the panel edges is solved. Dams at the edges of the panel constrain the slurry and retain it in the form of a trough bounded by the two blades and the two dams.

As will be seen from FIGURE 1 the width of the area covered by the slurry is fixed, as is the length. The amount of the slurry in the resultant trough is automatically controlled. Any one of a number of means may be used for automatically regulating the height of the slurry in the trough such as a float or a probe. The particular means used does not constitute part of the invention.

Measurements made of the viscosity of the slurry with which the desired results are obtained shows that the viscosity should be less than 50,000 centipoises. In other words, the filler can be neither putty-like nor viscous. By using a very acute angle, namely, an angle of less than about 25 degrees and a slurry having a viscosity of less than 50,000 c.p.s., pressures are achieved in the slurry under vibration which cause the slurry to settle and some of it to move laterally under the edge of the blade to overfill the openings. This result is important to be sure of complete filling. Slight overfilling is necessary in order that the filler may be compacted with hot plate pressure after it has dried and solidified. Overfilling also insures adequate filling for subsequent sanding.

While the above description is believed to teach one skilled in the art the method in accordance with the present invention, the following examples are given more fully to illustrate the practice of the invention.

Example I

A slurry was prepared consisting of: 5 parts by weight of 80 mesh marble dust, 0.5 part of dry phenolic resin powder, 1.8 parts of water; a 10% solution of phenolic resin was brushed over the surface of the plywood. The surface defects were overfilled with the slurry using a vibrating doctor blade set at an angle of about 20 degrees. Sanding dust was spread over the freshly filled surface using about 20 grams per square foot of surface. The panels were stacked for 20 hours, and after removing the sanding dust they were pressed in a hot press at a temperature of 320° F. for 4 minutes and a pressure of 175 p.s.i.

Example II

A slurry was prepared consisting of: 2.5 parts by weight of 80 mesh marble dust, 2.5 parts of whiting, 1.25 parts of melamine-urea binder, MUF 6004 (59% solids), 1.90 parts of water. The panel was pre-wet with water and the open defects were overfilled with a vibrating blade set at about 20 degrees. After drying the filler in an oven at approximately 200° F., the temperature was raised to 270° F. to cure the resin. The panels were then stacked for post-curing, after which they were sanded.

Example III

A slurry was prepared consisting of: 1 part of 80 mesh marble dust, 1 part of whiting, 1 part of polyester resin, using benzoyl peroxide catalyst. The slurry was introduced into the open defects with a vibrating blade set at an angle of about 12 degrees. The panels were then placed in an oven to raise the temperature to about 250° F. to harden the filler. The hot panels were solid piled for 24 hours, and then sanded.

What is claimed is:

1. The method of filling open defects, splits, and surface roughness in the outer veneers of plywood comprising the steps of:
   preparing a slurry having a viscosity less than 50,000 cps., comprised of fine mineral granules derived from minerals whose hardness is less than 6.0 on the Moh scale and liquid binder,
   moving the plywood in a substantially horizontal plane,
   depositing the slurry across the surface of plywood in a fixed width and controlled amount,
   removing the slurry from the elevated areas and retaining it in the openings and depressions with a doctor blade pressed against the surface at an angle of less than 25° relative to the surface thereby causing the slurry to settle and some of it to flow laterally under the edge of the blade to overfill the openings and surface depressions, vibrating the doctor blade, and hardening the slurry in the openings and depressions.

2. The method of claim 1 wherein the slurry is prepared with a thermo-setting resin and applying hot plate pressure after the slurry has dried thereby flattening the surface of the slurry in the openings and curing the resin.

3. The method of claim 1 including the steps of wetting the outer veneer surface of the plywood including the defects, splits and surface roughness before depositing the slurry and removing all excess wetting material from such surface.

4. The method of claim 3 wherein said step of wetting the surface includes wetting the surface with a dilute adhesive.

5. The method of claim 1 wherein the slurry is prepared with an aqueous binder and includes the steps of spreading dry ligno-cellulosic particles over the slurry filled surface and stacking the panels thereby to absorb the moisture from the slurry with the plywood and the ligno-cellulosic particles.

6. The method of claim 1, wherein said vibrating step includes vibrating the doctor blade with a vibrational component in the direction of movement of the panel.

7. The method of filling open defects, splits and surface roughness in the outer veneers of plywood comprising the steps of:
   preparing a slurry having a viscosity less than 50,000 cps. consisting of fine mineral granules derived from minerals whose hardness is less than 6.0 on the Moh scale and a liquid binder,
   moving the plywood in a substantially horizontal plane,
   wetting the outer surface of the plywood including the defects, splits and surface roughness,
   depositing the slurry across the surface of the plywood in a fixed width and controlled amount,
   removing the slurry from the elevated areas and retaining it in the openings and depressions with a doctor blade pressed against the surface at an angle of less than 25 degrees relative to the surface,
   directing vibrations into the slurry, thereby causing the slurry to settle and some of it to flow laterally under the edge of the blade to overfill the opening and surface depressions, and hardening the slurry in the openings and depressions.

8. The method of filling open defects, splits, and surface roughness in the surface veneer of plywood comprising the steps of:
preparing a slurry having a viscosity less than 50,000 cps. comprised of fine mineral granules derived from minerals whose hardness is less than 6.0 on the Moh scale and a liquid binder,
depositing the slurry on a substantially horizontal surface of the plywood,
moving the slurry across such surface and into openings thereof in a region having a trailing angle of less than 25° at the surface and under vibration, and
hardening the slurry in the openings.

9. The method of filling open defects in the face of a plywood panel which consists in filling the defects with an inorganic slurry having a viscosity of less than 50,000 cps. and a material whose hardness is less than 6.0 on the Moh scale while the panel moves by scraping a mass of slurry from the surface with a doctor blade set at an angle of less than 25 degrees while directing vibrations to the slurry.

10. The method of claim 9 wherein the vibrations are directed to the slurry by vibrating the doctor blade.

11. The method of claim 9 wherein the vibrations are directed to the slurry by vibrating the plywood.

12. The method of filling open defects in the face of a plywood panel comprising the steps of:
uniformly wetting the exposed face surface of the plywood,
spreading a slurry having a viscosity of less than 50,000 cps. and comprising fine mineral granules whose hardness is less than 6.0 on the Moh scale and a liquid binder over the surface with a doctor blade pressed against the surface at an angle less than 25 degrees,
vibrating the slurry and removing the excess slurry.

13. The method of filling open defects in the face of a plywood panel which consists in,
moving the plywood panel substantially horizontally across a support,
depositing a slurry consisting of fine mineral granules whose hardness is less than 6.0 on the Moh scale and a liquid binder across the surface of plywood with the slurry having a viscosity of less than 50,000 centipoises,
removing the slurry from elevated areas of the surface and retaining it in the openings and depressions with a doctor blade set at an angle of less than 25 degrees, and
applying vibratory pressure to the blade in a direction at right angles to the surface of the plywood and in the line of the reaction of the support.

References Cited

UNITED STATES PATENTS

| | | | |
|---|---|---|---|
| 2,320,702 | 6/1943 | Marchese et al. | 118—415 X |
| 2,630,395 | 3/1953 | McCullough | 156—94 |
| 2,770,556 | 11/1956 | Grangaard | 117—2 X |
| 2,847,701 | 8/1958 | Welch | 118—414 X |
| 2,860,597 | 11/1958 | Works et al. | 117—2 |
| 2,895,845 | 7/1959 | Jones et al. | 118—415 |
| 3,011,903 | 12/1961 | Clock et al. | 117—2 |
| 3,098,053 | 7/1963 | Hallonquest | 117—2 |

ALFRED L. LEAVITT, Primary Examiner

ALAN GRIMALDDI, Assistant Examiner

U.S. Cl. X.R.

117—45; 156—94